United States Patent

Wilson

[15] 3,678,387

[45] July 18, 1972

[54] SATELLITE COMMUNICATIONS SYSTEM

[72] Inventor: Quintus C. Wilson, Sudbury, Mass.

[73] Assignee: The United States of America as represented by the Secretary of the Air Force

[22] Filed: Aug. 5, 1970

[21] Appl. No.: 69,520

[52] U.S. Cl. .............................325/4, 343/100 SA, 325/11, 325/14

[51] Int. Cl. .......................................H04b 7/20, H04b 7/00

[58] Field of Search .............................325/4, 14, 1, 3, 9, 11; 343/100 SA, 100 CS, 100 ST

[56] References Cited

UNITED STATES PATENTS

| | | | |
|---|---|---|---|
| 3,133,282 | 5/1964 | Rosen | 325/4 |
| 3,331,071 | 7/1967 | Webb | 325/14 |
| 3,434,142 | 3/1969 | Andre et al. | 343/100 SA |

*Primary Examiner*—Robert L. Griffin
*Assistant Examiner*—John C. Martin
*Attorney*—Harry A. Herbert, Jr. and Willard R. Matthews, Jr.

[57] ABSTRACT

A ground-air communications system is disclosed that includes ground station processors, aircraft, and satellite borne repeaters. Satellite weight and power economies are achieved by scanning with repeater antennas. The preferred embodiment utilizes a phased array antenna having its antenna elements and amplifiers disposed in the satellite borne repeater and its phase shifting and modulating components disposed in the ground station processor. Phase shifted modulated carrier waves are translated in frequency prior to transmission from the ground station processor and are retranslated to their original frequencies by the repeater. Means are provided to lock transmitted and received carrier waves in phase and frequency.

1 Claim, 2 Drawing Figures

INVENTOR.
QUINTUS C. WILSON
BY Harry A. Herbert Jr. and
Willard R. Matthews
ATTORNEYS INVENTOR
QUINTUS C. WILSON
BY Harry A. Herbert Jr. and Willard R. Matthews
ATTORNEYS

SATELLITE COMMUNICATIONS SYSTEM

BACKGROUND OF THE INVENTION

This invention relates to ground-air communications systems that employ satellite borne repeaters and in particular to satellite borne repeaters having antenna beam scanning capabilities.

Communications systems of the type comprehended by the present invention have the very great advantage of providing direct communication over extremely long distances. This is accomplished by transmission through the satellite repeater thereby overcoming the curvature of the earth problem. The implementation of such a system, however, calls for the solution to various other serious problems.

Wide band satellite downlinks in the military or civilian VHF or UHF bands are not available for large scale operational systems. This is primarily due to international agreements prohibiting such operation and to the fundamental limitations of overcrowding and coexistence with numerous other communications systems. The only frequencies which can be utilized for satellite downlinks in accordance with international agreements are in the SHF bands. Frequency constraints on the uplinks are not so severe. The requirement that SHF bands be used for transmission therefore indicates that means must be found to overcome the path loss associated with SHF frequencies. Present technology does not permit sufficient RF satellite power generation for multiple access voice usage at SHF frequencies. Furthermore, high gain SHF antennas for aircraft impose severe structural, aerodynamic and pointing problems. These problems would be solvable if modest antenna gain could be obtained in a satellite repeater which would permit concentration of RF energy at selected areas on the surface of the earth. The use of a mechanically steerable antenna to accomplish this would require an extremely cumbersome system for simultaneous communications to widely deployed aircraft. Alternatively, the use of phased arrays on the satellite repeater could permit rapid steering and simultaneous pointing to user terminals. Unfortunately the phase shifting mechanisms are complicated and require an extensive crossbar switching facility.

Therefore, there is a present need for a satellite borne repeater having rapid steering and simultaneous pointing capabilities that does not make extreme weight and power demands upon the satellite. The present invention is directed toward accomplishing this and other ends.

SUMMARY OF THE INVENTION

The communications system of the present invention includes aircraft terminals, satellite repeaters and associated ground processing stations.

The satellite repeater incorporates an array of earth coverage antennas each driven by its own traveling wave amplifier and an independent translator and uplink from the ground station processor to the satellite. In addition, the satellite has a beacon which is used by the translator to assure that every signal will be coherently radiated by each of the antenna elements. The phasing of each element for each signal establishes the direction of the beam. The beacon signal received at the ground station processor permits the processor to transmit parallel FDM multiplexed channels of the proper phase relationship for the desired beam steering. This system is also linear and allows simultaneous signals to be directed arbitrarily.

It is a principal object of the invention to provide a new and improved ground-air communications system employing a satellite borne repeater having electronic scanning capabilities.

It is another object of the invention to provide an air-ground communications system of the type described that operates effectively at SHF bands.

It is another object of the invention to provide a satellite borne repeater having a phased array antenna, the phasing and crossbar modulating components of which are remotely located at a ground station processor.

These, together with other objects, advantages and features of the invention will become more apparent from the following detailed description when taken in conjunction with the illustrative embodiment of the accompanying drawings.

DETAILED DESCRIPTION OF THE PREFERRED EMBODIMENT

Figure 1:
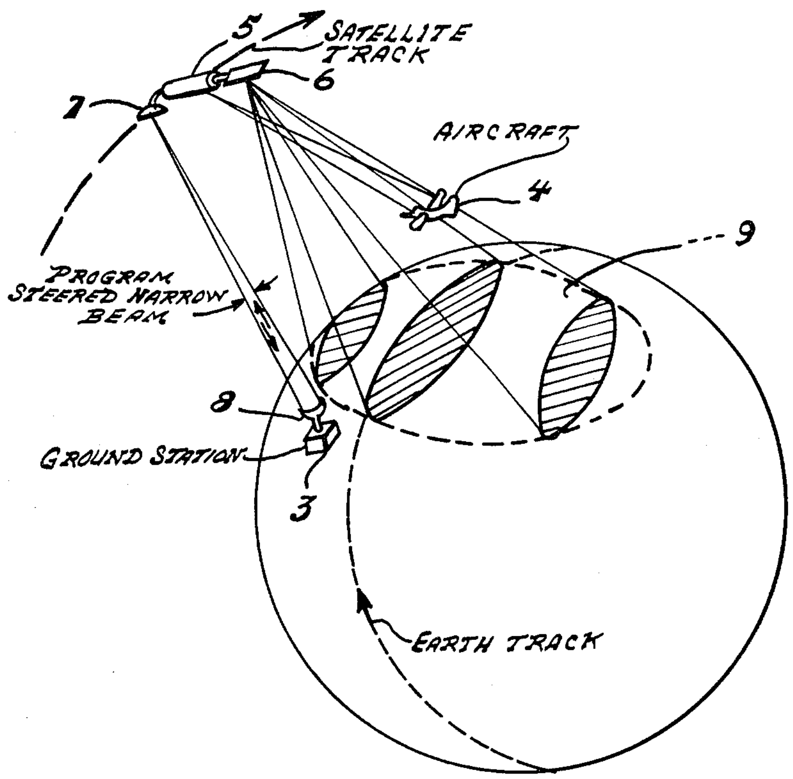
FIG. 1 is a pictorial illustration of the ground-air communications system that comprises the present invention.

The basic ground-air communications system of the invention is shown pictorially by FIG. 1, reference to which is now made. Although only one ground station 3, one satellite 5 and one aircraft 4 are shown, the invention comprehends multiple elements and a total system that will provide complete global coverage. Communication between ground station 3 and the repeater borne by satellite 5 is accomplished between X band antennas 7 and 8. The phased array antenna 6 provides beam steering over the surface area 9 in response to a phase shift program originating at the ground station processor. Communication between aircraft 4 and ground station 3 can therefore be made directly through the repeater on satellite 5 anywhere within the surface area 9 regardless of usual earth curvature limitation on direct transmission.

Figure 2:
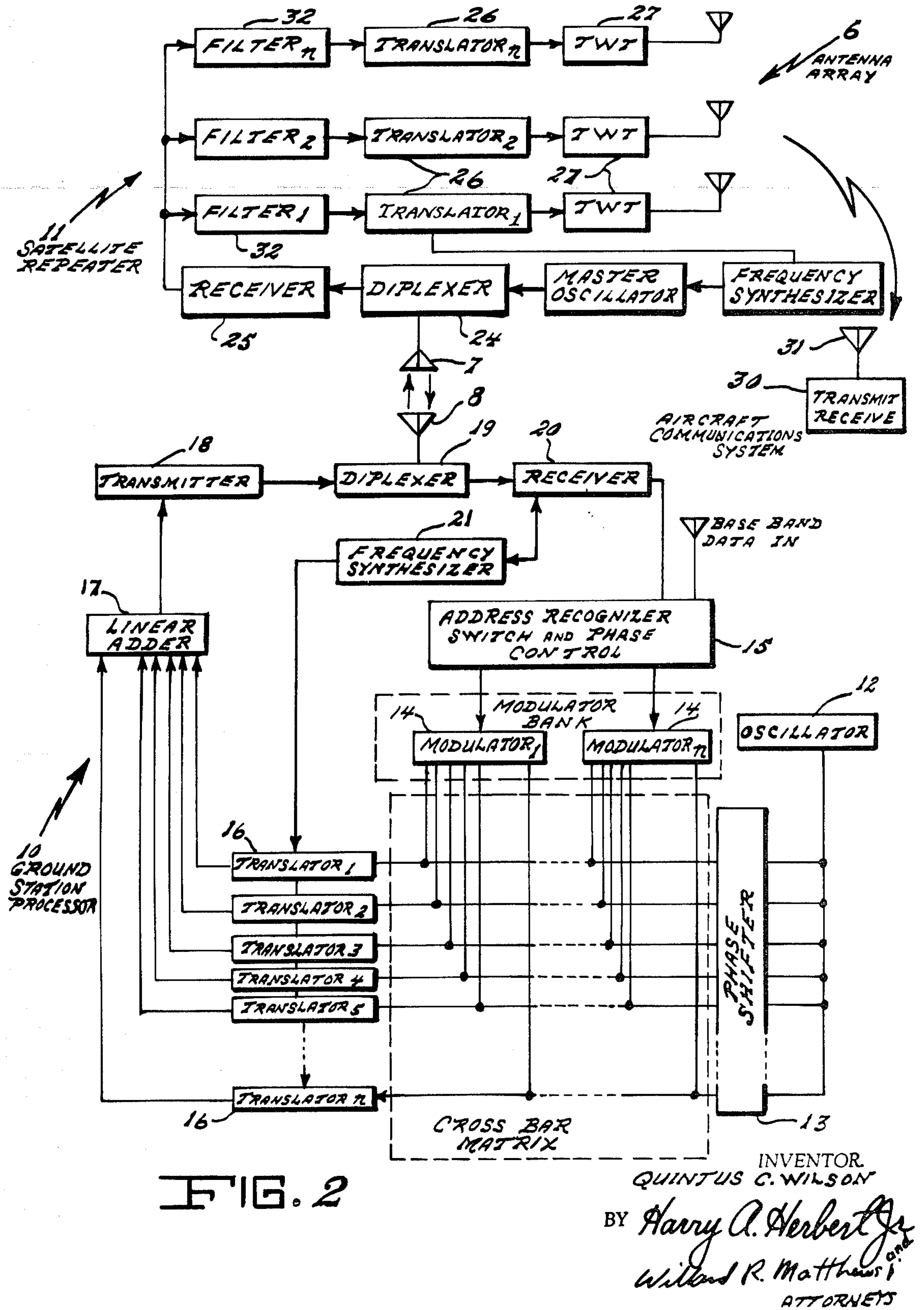
FIG. 2 is a block diagram of the ground-air communications system of FIG. 1.

Referring now to FIG. 2, there is illustrated thereby block diagrams a ground station processor 10, a satellite repeater 11 and an aircraft communications system 30 which together comprise the basic communications system of the invention. Oscillator 12 generates a carrier wave which is fed at any number of inputs of phase shifter 13. Phase shifter 13 in response to address recognizer and phase control 15 provides an appropriately phase shifted signal for each channel of the system. The phase shifting program information and other modulation and address information is received either from the base band data input or from receiver 20. The relative phases of each signal determine the beam direction of the repeater antenna array in accordance with conventional phased array principles. The outputs of phase shifter 13 are fed to the crossbar matrix where they are modulated by modulators 14. Multiple modulators provide a multiple access system and take advantage of the multiple beam scanning capabilities of phased array antennas. Translators 16 change the frequency of each phase shifted modulated carrier wave prior to transmission by transmitter 18 and X band antenna 8. Diplexers 19 and 24 are provided to permit simultaneous transmission and reception of signals.

The transmitted signals are received by X-band antenna 7 and receiver 25 of satellite repeater 11. Filters 32 determine the appropriate channel for received signals and translators 26 retranslate such signals to their original frequency. The signals are then amplified by traveling wave tube amplifiers 27 and fed to appropriate elements of phased array antenna 6. Master oscillator 23 and frequency synthesizers 21 and 22 provide phase and frequency lock for each carrier wave.

In summary, FIG. 2 shows the block diagram of a multi-element phase controlled system. The input to the system is either a wire line or a signal from the satellite to the ground station processor. In both cases, a baseband signal is available for modulating a carrier. Each signal modulates the several carriers which differ only by the phase difference necessary to steer the beam. These channels are each translated to the appropriate frequency for the uplink to an antenna element for a 16 channel system. Signals can be spaced 4.8 KHz apart so that 250 signals would occupy 1.2 MHz. Each of the 16 uplink channels would then be 1.2 MHz wide.

The address recognizer and crossbar switch operates from the input baseband signals to assign phases of the modulator carriers for proper beam steering.

Since the current state of microwave power generation would appear to preclude an inexpensive transmitter for a small terminal having modest antenna gain, the recommended uplink from the small terminal uses VHF or UHF to an earth coverage satellite antenna. Nevertheless, the system could work backwards with the ground station processor examining the outputs from the receiving channels for phase coherent signals from a member terminal. Discrimination against a jammer would be significant.

In operation, signals are transmitted by aircraft at L-band and are received by the satellite repeater through earth coverage antenna 6, translated to X-band, and sent directly to the ground processing stations. A large amount of gain can be provided in the downlink, through the use of a narrowbeam (3°, 35dB) satellite antenna, a very high gain ground receiving antenna, and a low-noise receiver. This allows the first hop to have very high capacity, of the order of 1,000 voice accesses. A 30 MHz bandwidth employed in this hop will assure that the system capacity is, in fact, limited by the downlink gain, rather than by background noise transmitted by the satellite.

Since the capacity of this first hop is much greater than that of the overall system, substantial margin results which accommodates uplink power variations due to propagation anomalies, interference, and aircraft antenna gain non-uniformity. Gain non-uniformity or the variation below peak gain of the beam, is expected to be very small at L-band.

The bandwidth of each aircraft's signal can be made 3 MHz; this allows simple aircraft transmitter design. User bandwidths are assigned uniformly over the entire 30 MHz system bandwidth. Certain users could occupy the entire 30 MHz system bandwidth, if increased interference resistance were felt to justify the increased transmitter cost.

The ground station receives the composite 30 MHz signal and feeds it to a bank of spread spectrum receivers, each set adjusted to receive a particular code. Codes are pre-assigned to users and can, of course, be changed at will. There are as many receivers as the number of simultaneous channels the system can accommodate. The receivers provide DC (baseband) outputs.

At these outputs cryptographic equipment can be introduced on a link by link basis as required. The received signals are switched while in plain language. Outgoing signals are encrypted and transmitted to users. When appropriate, signals can be patched at the ground processing station into other systems such as Autovon, Autodin, DCS, or special links from the processor to other ground sites.

To transmit signals to aircraft, the ground processing station takes each signal, PSK modulates a carrier with it, and feeds this carrier to a bank of 16 phase shifters. These are adjusted to appropriately steer the satellite downlink beams. Separate carriers are employed for the different channels; each has its own set of phase shifters. Of course, the beams that are formed by this phasing technique have quite wide beamwidth ($\approx$ 4.5°); thus thirty or so discrete beams are sufficient to completely illuminate the portion of the earth in view of the satellite. Each channel does not really require its own set of phase shifters, but at least 30 sets (16 phases/set) are required.

The several frequency division channels are transmitted up to the satellite at X-band using the high gain ground station antenna and the narrow-beam satellite antenna. The center frequencies of the 16 composite uplink channels are determined by a synthesizer from a single master oscillator in the satellite. The corresponding signals, used in the ground station to frequency division multiplex and translate the signals up to X-band are phase locked to this master oscillator signal via a satellite beacon telemetry link. By locking all signals to the master oscillator, any phase or frequency shifting of the various signals which might occur due to slight changes in range between the ground station and the satellite is eliminated. The satellite demultiplexes the wideband signal (received from the processor) sending each composite signal through a separate IF amplifier, power amplifier and array element. The IF outputs are up-converted to a common frequency in L-band, the required mixing signals being derived from the satellite master oscillator. In this manner, the phase values for beam steering (which were selected by the ground computer) are preserved and appear at the 16 antenna elements as the RF phases of the individual L-band signals.

Accordingly, it is understood that the scope of the invention in its broader aspect is to be defined by the appended claims only and no limitation is to be inferred from definite language used in describing certain preferred embodiments.

What is claimed is:

1. A ground-air communication system comprising means, disposed in at least one ground station, for transmitting and receiving electromagnetic wave energy, means, disposed in at least one aircraft, for transmitting and receiving electromagnetic wave energy, at least one satellite borne repeater, each said repeater having a phased array antenna system comprising a multiplicity of proximate spaced antenna elements, means for generating a carrier wave for each antenna element, means for phase shifting individual carrier waves, means for modulating said carrier waves, and amplifier means for amplifying said phase shifted modulated carrier waves, said antenna elements and said amplifier means being an integral part of said satellite borne repeater, and said means for generating carrier waves, said means for phase shifting said carrier waves, and said means for modulating said carrier waves being disposed in said ground station, first translator means disposed in said ground station for translating each said carrier wave to a different frequency, second translator means disposed in said satellite repeater, for retranslating each said carrier wave to its original frequency, and means for locking in phase and frequency the inputs of said first translator means with the outputs of said second translator means.

* * * * *